Nov. 24, 1936.  F. X. REES  2,062,274
POWER SUPPLY SYSTEM
Filed July 22, 1935   2 Sheets—Sheet 1
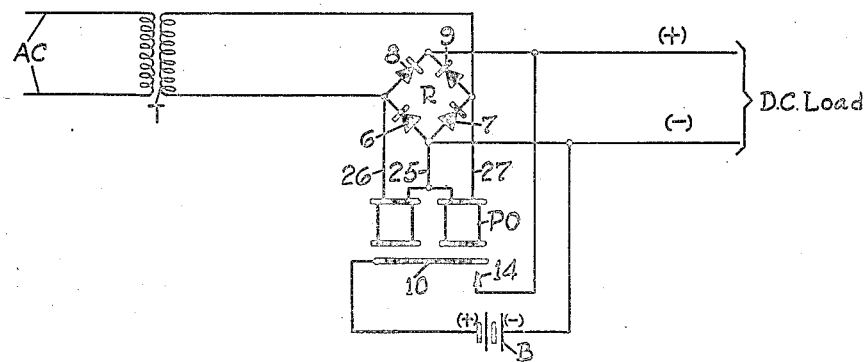
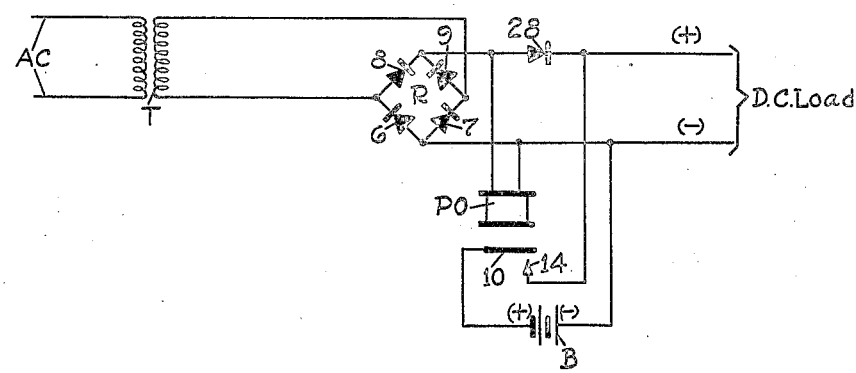
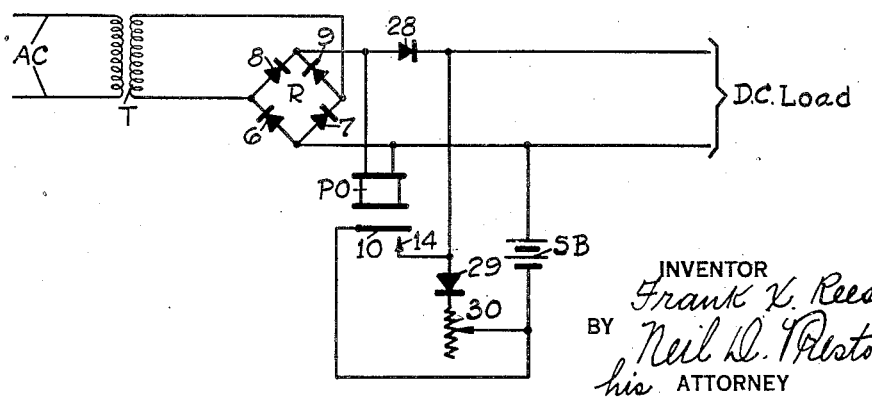
INVENTOR
Frank X. Rees,
BY Neil D. Preston,
his ATTORNEY Nov. 24, 1936.  F. X. REES  2,062,274
POWER SUPPLY SYSTEM
Filed July 22, 1935   2 Sheets-Sheet 2

INVENTOR
Frank X. Rees,
BY Neil W. Preston,
his ATTORNEY

Patented Nov. 24, 1936

2,062,274

UNITED STATES PATENT OFFICE 2,062,274

POWER SUPPLY SYSTEM

Frank X. Rees, Albany, N. Y., assignor to General Railway Signal Company, Rochester, N. Y.

Application July 22, 1935, Serial No. 32,565

16 Claims. (Cl. 171—97)

This invention relates to power supply organizations for railway signalling systems and the like, and more particularly to a system for normally supplying rectified alternating current to the load circuits, and for employing a battery as a reserve or stand-by source, with means for automatically connecting the battery with the load circuits upon failure or abnormal drop in voltage of the alternating current supply.

In the typical power supply organization for railway signalling systems of various kinds, it is desirable to connect the reserve battery to the load circuits quickly upon failure of the alternating current supply, so that certain relays or other devices, more particularly stick relays for example, may not be de-energized even temporarily in case of power failure. It is also desirable to connect the battery to the load circuits at times when, due to an extra heavy load or other cause, the voltage of the rectified alternating current drops below a suitable normal voltage. An alternating current power transfer relay, which is commonly used, aside from various objectionable characteristics such as the tendency to vibrate, is relatively slow in releasing and does not respond accurately to small change in voltage.

When a storage battery is used as the reserve or stand-by source, it is desirable to employ the rectified alternating current to maintain the battery charged; and when this is done, the normal voltage on the load circuits to provide such charging voltage is usually considerably higher than the voltage of the battery after it has carried the load for a time; and since the relays, lamps, and other devices of the signalling system should be arranged to operate properly on the lower voltage of the battery after it has been used for a time as a reserve supply, it follows that the load voltage normally applied to the load circuits from the rectified alternating current supply is higher than necessary, thereby impairing the efficiency of the power supply organization.

With these and other considerations in mind, it is proposed in accordance with this invention, generally speaking, to employ a power transfer relay of the direct current tractive type, which will respond quickly to relatively small changes in voltage, and to energize this relay from the out-put circuit of the rectifier in such a way that the battery when connected to the load circuit will not improperly energize the relay. It is also proposed to provide an additional blocking rectifier when a storage battery is used as the reserve source in such a way that, while the battery is maintained charged, it cannot discharge to the load circuits under normal conditions, with the power transfer relay energized, and so that the voltage of the load circuit normally is lower than the open circuit of the voltage of the battery, and is comparable with the desirable and efficient voltage for the load.

Other purposes, attributes and characteristic features of the invention will be in part apparent and in part pointed out as the description progresses.

In the accompanying drawings, Fig. 1 illustrates in a simplified and diagrammatic manner one embodiment of the invention for use with a primary battery as a reserve source;

Fig. 2 shows a variation or modification of the arrangement of Fig. 1;

Fig. 3 illustrates an embodiment of the invention for use with a storage battery as a reserve source;

Referring first to Fig. 1, it is contemplated that the direct current load circuit will be normally supplied with rectified alternating current from a suitable source, indicated by the letters A C, with a transformer T, preferably with taps to provide the desired voltage for the input circuit of a double-wave rectifier R of the usual type and construction, preferably of the dry-plate or copper-oxide type. The individual rectifiers 6, 7, 8, and 9 of the complete rectifier R are illustrated with the usual arrow convention; and it will be apparent how the alternating current voltage impressed across the input terminals of this double-wave rectifier R is rectified to give a full-wave uni-directional voltage for the load circuit. This load circuit may include relays for various functions in a signalling system, including directional stick relays or the like, or lamps for the signals, or various other types and kinds of direct current devices, commonly employed in railway signalling.

Figure 4:
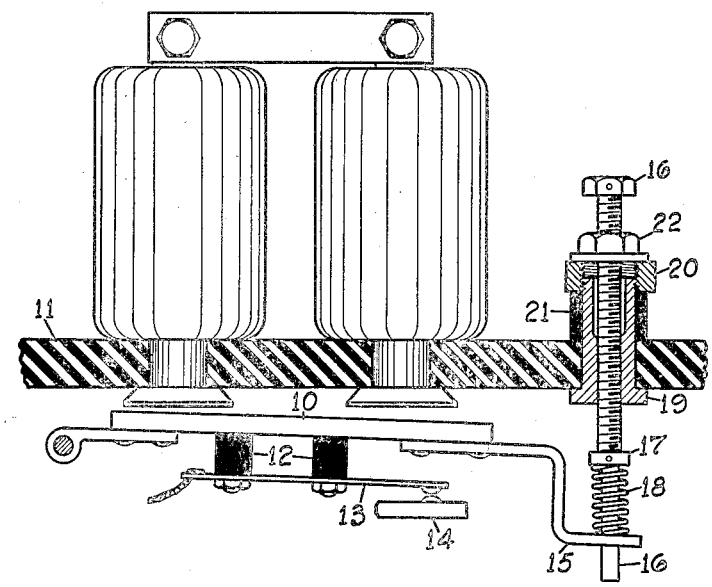
Fig. 4 is a fragmentary illustration of a preferred construction of the power transfer relay.

The power-off or transfer relay PO, used in connection with this invention, is a typical direct current relay of the tractive type, with its air gap, contacts and other parts so arranged or adjusted that it will respond quickly to a small decrease in voltage below the normal operating voltage. Among other things, this relay is preferably provided with a spring, which can have its pressure accurately adjusted, to act in addition to the weight of the armature as a biasing force to move the armature toward its retracted position. One typical construction, suitable for this purpose, is illustrated in Fig. 4, and comprises the usual magnetic structure with a pivoted armature 10, all attached to and supported by a plate 11, preferably of insulated material. The armature 10 has attached thereto by suitable insulators 12 a relatively stiff contact finger 13 engaging a stationary contact 14, supported in any suitable manner not specifically illustrated. The contact finger 13 is sufficiently stiff or rigid so that the contacts 13—14 are operated by a relatively small movement of the armature. Attached to the armature 10 is a bracket 15, in which slides loosely the lower end of an adjustable rod 16 having a collar 17 fixed thereto. A compression coil spring 18 around the rod is located between the bracket 15 and the collar 17, so as to exert a downward biasing force on the bracket and armature in accordance with the adjusted position of the rod. The rod 16 is threaded through a sleeve 19, which is fixed to the plate of the relay by a nut 20 by clamping against an insulated sleeve 21. The upper end of the rod 16 is provided with a head 16ᵃ by which it may be turned, and a jam nut 22 engaging a washer holds the rod in its adjusted position. Other specific variations of the same construction may, of course, be employed.

With the structure of the power-off relay PO, such as shown in Fig. 4 and just described, the tension of the spring 18 may be accurately adjusted so that the back contacts 13—14 are open when the relay is energized with normal voltage, but will close quickly when the voltage drops a small per cent, the armature 10 moving a short distance and giving a relatively small contact opening.

In the arrangement of Fig. 1, the mid-tap between the two coils of the relay PO is connected by a wire 25 to one terminal of the load circuit; and the other terminals of these relay coils are connected to the input terminals of the rectifier R by wires 26 and 27. In other words, one winding of the relay is connected across one individual rectifier 6, and the other across another individual rectifier 7. It can be seen that this arrangement energizes the two coils of the relay PO alternately with half cycles of alternating current. For example, on one half cycle of one polarity, current through the one relay coil is blocked by the rectifier 6 and flows through the left-hand coil and rectifier 7; and on the other half cycle of the other polarity, the other coil of the relay is energized in the same way.

In case of failure of the alternating current supply, or a drop in its normal voltage, the armature 10 of the relay PO drops and causes its back contacts 14 to connect the reserve battery B across the load circuit. When this occurs, current from the battery B cannot flow through the winding of the relay PO, being blocked by the individual rectifiers 8 and 9. Consequently, when the reserve battery B is connected to the load circuit, it does not act to energize the relay PO, as would otherwise occur without this circuit arrangement and blocking rectifiers.

Fig. 2 illustrates a variation or modification, in which an additional rectifier 28 is interposed in one of the load bus wires between the rectifier R and the connections to the reserve battery B, so as to block the current from this battery to the relay PO. In this modification, both coils of the relay PO are connected in series in the usual way and then connected across the load circuit or output terminals of the rectifier R.

In the arrangements of Figs. 1 and 2, the battery B is used as the reserve source of current to energize the load circuits when the alternating current supply voltage fails or is abnormally low; and in these arrangements the battery is normally disconnected from the out-put circuit of the rectifier, and receives no charging current. Hence, in these arrangements, the battery B is a primary battery, or a storage battery which does not receive any maintained charge.

In some types of signalling systems, however, it may be expedient to employ a storage battery as a reserve or standby source, and when this is done, it is desirable to maintain this battery charged from the same rectified source of alternating current. In this connection, it is a well-known characteristic of a storage battery that its voltage drops under load; and hence the relays, lamps, or other devices in the load circuit would ordinarily be designed to operate properly with the voltage of the reserve battery when partly discharged. If the reserve storage battery is to be charged from the out-put circuit of the rectifier, and is connected directly across the load circuit, then it is apparent that the normal load voltage will be as high as the open circuit charging voltage for the battery; and under these conditions, the normal load voltage is considerably higher than that for which the devices of the load circuit would be designed.

With these factors in mind, the modification of Fig. 3 is employed when storage batteries are used as a reserve source. This modification of Fig. 3, as shown, is substantially the same as Fig. 2 with respect to the connections of power-off relay PO; but it should be understood that the arrangement of Fig. 1 may be similarly employed. In the modification of Fig. 3, the reserve storage battery SB is connected across the load circuit in series with a blocking rectifier 29 and adjustable resistance 30; and the de-energization of the relay PO, due to failure or depreciation of the rectified voltage, closes its back contacts to establish a low resistance shunt around this blocking rectifier 29 and resistance 30. It will be noted that the rectifier 29 blocks the flow of current from the battery SB to the load circuit but allows charging current to flow to the battery.

Figure 5:
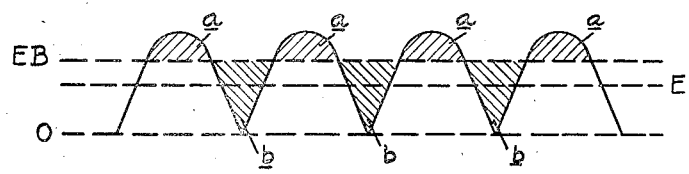
Fig. 5 is an explanatory diagram of voltage curves for the embodiment of Fig. 3.

The advantages of this organization illustrated in Fig. 3 are conveniently explained by discussing typical conditions illustrated by the curves of Fig. 5. Assuming the usual commercial alternating current supply and an effective double-wave rectifier organization, the voltage of the output circuit of the rectifier may be assumed to be as shown in Fig. 5. If the average voltage of this double-wave rectified alternating current, to which the devices and the load circuit respond, is indicated by the line E, then the open circuit voltage of the storage battery SB may be somewhat higher, as indicated by the line EB, the battery then receiving charging current through the blocking rectifier 29 during the peak voltages above this line EB, as indicated by the shaded portions a. Thus, the voltage EB of the battery on open circuit is greater than the normal load voltage E, and may drop considerably when the load has been applied to the battery for a time, without falling below a voltage suitable for the operation of the devices connected to the load circuit. The blocking rectifier 29 prevents discharge of the battery during the time intervals when the out-put voltage of the rectifier R falls below the battery voltage, indicated by line EB, and as illustrated by the shaded portions b. This reduces the current that must be supplied to the battery to keep it charged.

What I claim as new is:—

1. In a power supply system for railroad signalling, the combination with a load circuit demanding a constant supply of direct current, of a battery, a source of rectified alternating current, a direct current relay of the tractive type for connecting said battery to the load circuit, and means connecting said relay to the load circuit to permit energization thereof from said source of rectified alternating current but not from said battery when connected to the load circuit.

2. In a power supply system for railroad signalling, in combination, a load circuit demanding a constant supply of direct current, a battery, a source of rectified alternating current, a direct current relay energized from said load circuit for connecting said battery to said load circuit upon an abnormal drop in voltage of said source of rectified alternating current, and means preventing energization of said relay from said battery.

3. In a power supply system for railroad signalling, the combination with a load circuit demanding a constant supply of direct current, of a battery, a source of rectified alternating current, a direct current relay of the tractive type normally energized from said load circuit for closing contacts when partially de-energized upon an abnormal drop in the voltage of said source of rectified current for connecting said battery to said load circuit, and a rectifier for blocking the flow of current from said battery to said relay.

4. In a power supply system for railroad signalling, the combination with a load circuit requiring a continuous supply of uni-directional current, of a source of alternating current, a double-wave rectifier connecting said source to said load circuit, a battery, a relay having windings connected across said individual units of said rectifier to be energized by current from said rectifier but not by current from said load circuit, and means operated by said relay for connecting said battery to said load circuit.

5. In a power supply system for railroads, the combination with a load circuit, of a source of alternating current, a double wave rectifier connecting said source to said load circuit, a relay having two windings with one terminal of each winding connected to one wire of the load circuit, the other terminals of said relay windings being connected to the input terminals of said rectifier, whereby said windings of said relay are alternately energized by half cycles of current of opposite polarity from said source of alternating current but are not energized by current from the load circuit, and means operated by said relay for connecting said battery to said load circuit.

6. A power supply system for railway signalling comprising, a load circuit, a source of alternating current, a full-wave rectifier connecting said source and said load circuit, a battery, a relay having back contacts for connecting said battery to said load circuit, and means for rendering said relay responsive to the voltage of the rectified alternating current from said source but not to the voltage of the battery when connected to said load circuit.

7. A power supply system for railroad signalling comprising, a load circuit, a source of alternating current, a full-wave rectifier connecting said source to said load circuit, a battery, a power-off relay for connecting said battery to said load circuit, and means connecting said relay to said rectifier to be energized by the rectified alternating current but not by current from said battery when connected to said load circuit.

8. A power supply system for railway signalling comprising, in combination with a load circuit, a source of alternating current, a double-wave rectifier, a reserve source of direct current, a relay for connecting said reserve source to said load circuit upon an abnormal drop in voltage, and means including a rectifier for rendering said relay responsive to the voltage applied to said load circuit from said source of alternating current and rectifier but not to the voltage of said reserve source.

9. In a power supply system for railroad signalling, the combination with a load circuit requiring a continuous supply of uni-directional current, of a source of rectified alternating current normally connected to said load circuit, a battery, a direct current relay of the tractive type having an adjustable biasing spring for connecting said battery to said load circuit when the voltage energizing said relay falls below a predetermined value, and means for rendering said relay responsive to the voltage applied to said load system circuit from said rectified source but not to the voltage of said battery when connected to said load circuit.

10. In a power supply system for railway signalling, in combination with a load circuit requiring a continuous supply of uni-directional current, a source of rectified alternating current, a storage battery, means connecting said storage battery to said load circuit and including a rectifier blocking the flow of current from said battery to said load circuit but permitting the flow of charging current from the load circuit to the battery, and means responsive to the out-put voltage of said rectified source only for connecting said battery to the load circuit directly without said rectifier.

11. In a power supply system for railway signalling, in combination with a load circuit requiring a continuous supply of uni-directional current, a source of rectified alternating current normally connected to said load circuit, a storage battery, means including a rectifier for normally connecting said storage battery to said load circuit, said rectifier blocking the flow of current from said battery to the load circuit but permitting the flow of charging current to the battery, and a direct current relay of the tractive type responsive to the voltage of said source only for establishing a shunt around said blocking rectifier upon an abnormal drop in voltage from said source.

12. In a power supply system for railway signalling, in combination with a load circuit requiring a continuous supply of uni-directional current, a source of rectified alternating current for normally energizing said load circuit, a storage battery, means normally connecting said storage battery to said load circuit to permit charging thereof but preventing discharge of said battery to said load circuit, and a power-off relay responsive to the voltage from said rectified source but not to the voltage of said battery for rendering said battery effective to supply current to said load circuit upon an abnormal drop in voltage of said rectified source.

13. In a power supply system for railway signalling, in combination with a load circuit requiring a continuous supply of uni-directional current, a source of alternating current, a double-wave rectifier connecting said source to said load circuit, a storage battery, means normally connecting said storage battery to said load circuit to permit charge thereof but preventing flow of current from the battery to the load circuit, a power-off relay connected to said load circuit for directly connecting said battery to said load circuit, and means preventing energization of said relay by said battery.

14. In a power supply system for railway signalling, in combination with a load circuit requiring a continuous supply of uni-directional current, a source of alternating current, a double-wave rectifier connecting said source to said load circuit, a storage battery, means including a half-wave rectifier and an adjustable resistance for connecting said battery to the load circuit, said half wave rectifier blocking the flow of current from the battery to the load circuit but permitting the flow of charging current to the battery, and means responsive to an abnormal drop in voltage of the load circuit for directly connecting said battery to the load circuit.

15. A power supply system for railway signalling characterized by a storage battery normally charged from a load circuit but not supplying current to said load circuit, a direct current power-off relay of the tractive type for rendering said battery effective to supply current to said load circuit, and means preventing energization of said relay by current from said battery.

16. In a system for supplying uni-directional current to a load circuit from a source of rectified alternating current, a reserve battery normally charged from said load circuit but not supplying current to said load circuit, and means for rendering said battery effective to supply current to the load circuit upon an abnormal drop in voltage of said rectified source, said means being not responsive to current supplied to said load circuit from said battery.

FRANK X. REES.